United States Patent
Gintis et al.

(10) Patent No.: US 8,310,942 B2
(45) Date of Patent: Nov. 13, 2012

(54) FLOW STATISTICS AGGREGATION

(75) Inventors: Noah Gintis, Westlake Village, CA (US); Anca Suciu, Bucharest (RO)

(73) Assignee: Ixia, Calabasas, CA (US)

( * ) Notice: Subject to any disclaimer, the term of this patent is extended or adjusted under 35 U.S.C. 154(b) by 249 days.

(21) Appl. No.: 12/870,729

(22) Filed: Aug. 27, 2010

(65) Prior Publication Data

US 2012/0051234 A1    Mar. 1, 2012

(51) Int. Cl.
*H04L 12/26* (2006.01)

(52) U.S. Cl. ........................................................ 370/250

(58) Field of Classification Search .......... 370/241–245, 370/250–252, 389–394, 395.5–395.52
See application file for complete search history.

(56) References Cited

U.S. PATENT DOCUMENTS

| | | | |
|---|---|---|---|
| 5,343,463 A | 8/1994 | van Tetering et al. |
| 5,477,531 A | 12/1995 | McKee |
| 5,600,632 A | 2/1997 | Schulman |
| 5,742,760 A | 4/1998 | Picazo, Jr. et al. |
| 5,787,253 A | 7/1998 | McCreery et al. |
| 5,850,386 A | 12/1998 | Anderson et al. |
| 5,878,032 A | 3/1999 | Mirek et al. |
| 5,982,753 A | 11/1999 | Pendelton et al. |
| 6,028,847 A | 2/2000 | Beanland |
| 6,041,053 A | 3/2000 | Douceur et al. |
| 6,065,053 A | 5/2000 | Nouri et al. |
| 6,088,777 A | 7/2000 | Sorber |
| 6,172,989 B1 | 1/2001 | Yanagihara |
| 6,252,891 B1 | 6/2001 | Perches |
| 6,295,557 B1 | 9/2001 | Foss |
| 6,360,332 B1 | 3/2002 | Weinberg |
| 6,446,121 B1 | 9/2002 | Shah |
| 6,545,979 B1 | 4/2003 | Poulin |
| 6,601,098 B1 | 7/2003 | Case et al. |
| 6,717,917 B1 | 4/2004 | Weissberger et al. |
| 6,728,929 B1 | 4/2004 | Luong |
| 6,789,100 B2 | 9/2004 | Nemirovsky |
| 6,820,034 B2 | 11/2004 | Hanes et al. |
| 6,823,219 B2 | 11/2004 | Lee et al. |
| 6,888,818 B1 | 5/2005 | Gubbi |
| 6,910,061 B2 | 6/2005 | Hu |
| 6,950,405 B2 | 9/2005 | Van Gerrevink |
| 7,007,089 B2 | 2/2006 | Freedman |
| 7,035,223 B1 | 4/2006 | Burchfiel et al. |

(Continued)

OTHER PUBLICATIONS

European Patent Office, European Search Report, European Patent Office, European Search Report for European Application No. 11008066.0, mail date Feb. 10, 2012, pp. 1-8.

(Continued)

*Primary Examiner* — Frank Duong
(74) *Attorney, Agent, or Firm* — SoCal IP Law Group LLP; Steven C. Sereboff; John E. Gunther

(57) ABSTRACT

There are disclosed methods and apparatus for testing a network. A plurality of packets may be transmitted over the network from one or more source port units. Each transmitted packet may include a packet group identifier (PGID) corresponding to a unique combination of values for a plurality of tracking factors. The packets may be received at one or more destination port units. Each destination port unit may extract the PGID from each received packet and may accumulate traffic statistics for each of the plurality of PGIDs. The accumulated traffic statistics for at least some of the plurality of PGIDs may be aggregated to report summary statistics for a selected tracking factor.

15 Claims, 11 Drawing Sheets

U.S. PATENT DOCUMENTS

| | | |
|---|---|---|
| 7,187,683 B1 | 3/2007 | Sandoval et al. |
| 7,406,089 B1 | 7/2008 | Rahim et al. |
| 7,443,870 B2 | 10/2008 | Zioulas et al. |
| 7,489,706 B2 | 2/2009 | Hatley |
| 7,561,559 B2 | 7/2009 | Hannel et al. |
| 7,594,159 B2 | 9/2009 | Fujikami et al. |
| 7,643,431 B2 | 1/2010 | Pepper |
| 7,826,377 B2 | 11/2010 | Pepper |
| 7,826,381 B1 * | 11/2010 | Kastuar et al. ............. 370/242 |
| 2001/0016867 A1 | 8/2001 | Hu |
| 2002/0183969 A1 | 12/2002 | Hanes et al. |
| 2003/0033025 A1 | 2/2003 | Lee et al. |
| 2004/0052259 A1 | 3/2004 | Garcia |
| 2004/0252686 A1 | 12/2004 | Hooper |
| 2005/0286564 A1 | 12/2005 | Hatley |
| 2006/0088060 A1 | 4/2006 | Fujikami et al. |
| 2006/0153078 A1 | 7/2006 | Yasui |
| 2007/0115833 A1 | 5/2007 | Pepper |
| 2007/0291654 A1 | 12/2007 | Pepper |
| 2008/0112332 A1 | 5/2008 | Pepper |
| 2009/0310491 A1 | 12/2009 | Ginsberg |

OTHER PUBLICATIONS

Sadasivan et al., Architecture for IP Flow Information Export, Network Working Group, article, Mar. 2009, pp. 1-31.

Brownlee et al., Traffic Flow Measurement: Architecture, Network Working Group, The University of Auckland, GTE Laboratories, Inc. and GTE Internetworking, Oct. 1999, pp. 1-49.

IXIA, IxExplorer User's Guide, Revision 2.1.0 published Nov. 1, 1999.

IXIA, Specifications for Load Modules—Multilayer Gigibit Ethernet for LM1000LX, LM1000SX, LM1000GBIC, LM1000T, Product Specification Sheet.

IXIA, The Ixia 200 Traffic Generator and Analyzer, Product Description, 1997-1999.

IXIA, Ixia 200 Chassis, Product Description.

* cited by examiner

FLOW STATISTICS AGGREGATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and receiving traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module with the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple concurrent outgoing streams, for example to accommodate multiple packet types, rates, or destinations. "Simultaneous" means "at exactly the same time." "Concurrent" means "within the same time."

The test traffic may be divided into a plurality of "traffic items", where each traffic item is effectively a separate test from each other traffic item. Test traffic for some or all of a plurality of traffic items may be generated and transmitted concurrently. Each traffic items may include a plurality of streams, and each stream may typically be a portion of a single traffic item.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, a hardware "unit" also means a collection of hardware, which may be augmented by firmware and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
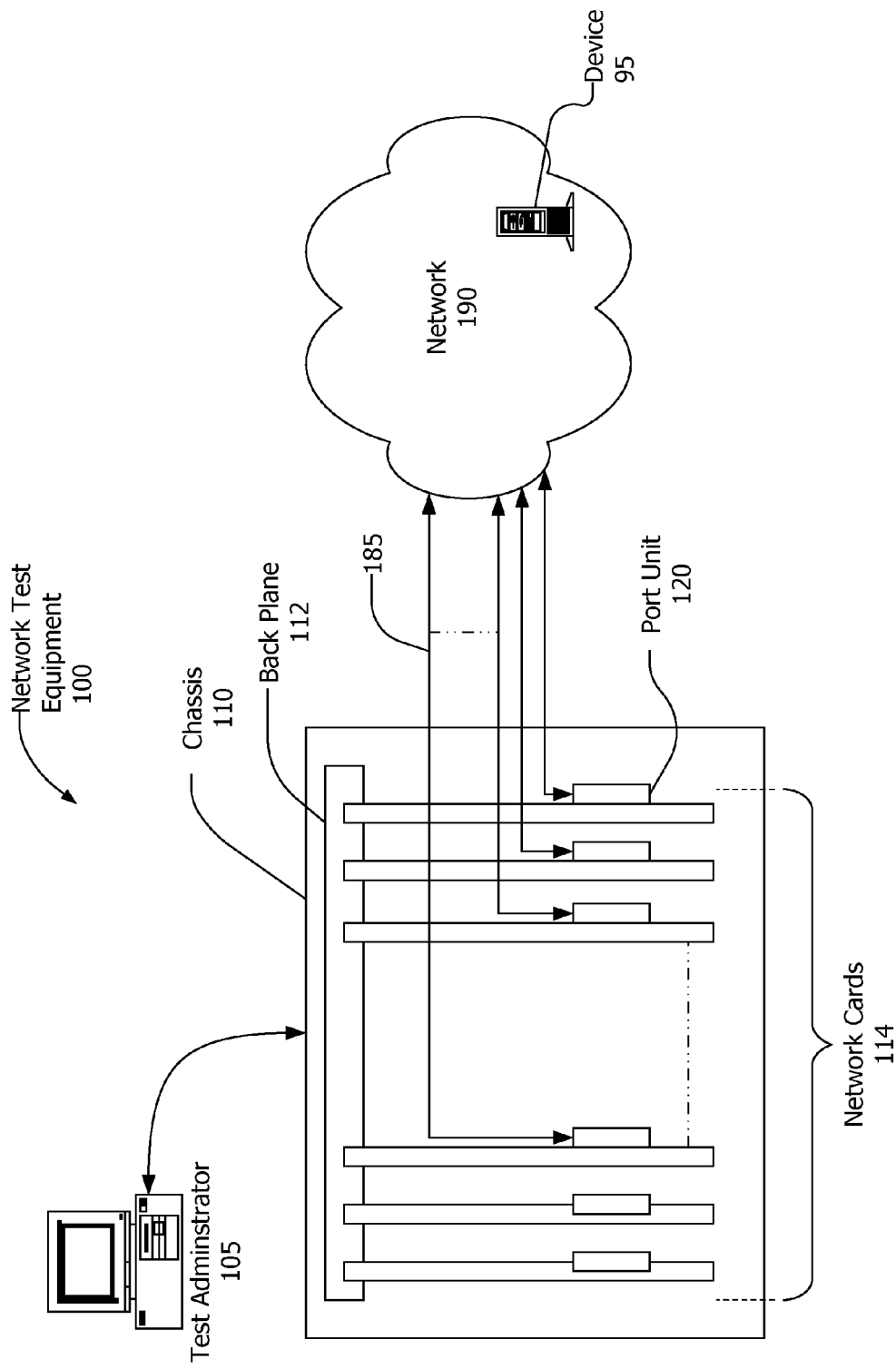
FIG. 1 is a block diagram of a network environment.

FIG. 1 shows a block diagram of a network environment. The environment may include network test equipment 100 and a network 190 which may include one or more network device 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may support a single communications protocol, may support a number of related protocols, or may support a number of unrelated protocols. The network cards 114 may be permanently installed in the network test equipment 100 or may be removable.

Each network card 114 may contain one or more port unit 120. One port unit or a plurality of port units may connect to the network 190 through respective ports. Each port may be connected to the network through a respective communication medium 185, which may be a wire, an optical fiber, a wireless link, or other communication medium. The communications media connecting the network to the plurality of port units may be the same or different. Each port unit 120 may generate and transmit test traffic to the network, and each port unit 120 may receive test traffic from the network. Packets transmitted by one of the port units 120 may commonly be received by one or more other port units.

The backplane 112 may serve as a bus or communications medium for the network cards 114. The backplane 112 may also provide power to the network cards 114.

The network test equipment may communicate with a test administrator 105. The test administrator 105 may be a computing device contained within, or external to, the network test equipment 100. The network test equipment may include an operator interface (not shown) for receiving test instructions from and displaying test results to an operator.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and logical paths for data to travel.

The network device 195 may be any devices capable of communicating over the network 190. The network devices 195 may include one or more of servers, network capable storage devices including disk drives such as network attached storage (NAS) and storage area network (SAN) devices, routers, relays, hubs, switches, bridges, multiplexers and other devices.

Figure 2:
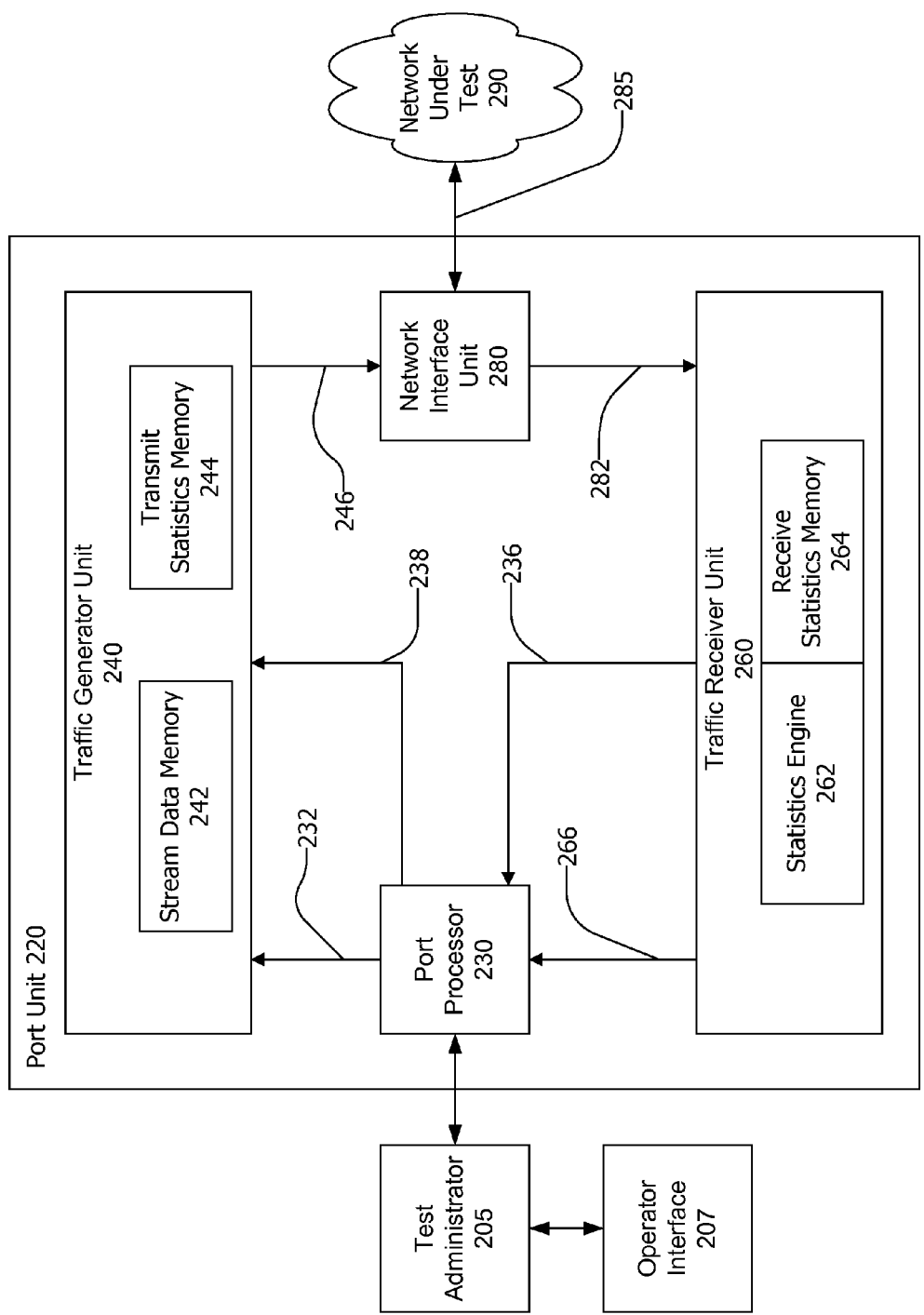
FIG. 2 is a block diagram of a port unit.

Referring now to FIG. 2, an exemplary port unit 220 may include a port processor 230, a traffic generator unit 240, a traffic receiver unit 260, and a network interface unit 280 which couples the port unit 220 to a network under test 290. The port unit 220 may be all or part of a network card such as the network cards 114.

The port processor 230 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 230 may communicate with a test administrator 205. The test administrator 205 may provide the port processor 230 with instructions and data required for the port unit 220 to participate in testing the network 290. The instructions and data received from the test administrator 205 may include, for example, definitions of packet streams to be generated by the port unit 220 and definitions of performance statistics to be accumulated and reported by the port unit 220. The test administrator 205 may be coupled to or include an operator interface 207. The operator interface 207 may be used to receive commands and requests from an operator (not shown) and to present test data to the operator. The operator may be, for example, a test engineer or system operator who needs access to the test data.

The port processor 230 may provide the traffic generator unit 240 with stream data 232 which may be stored in a stream data memory 242 within the traffic generator unit 240. The stream data 232 may cause the traffic generator unit 240 to form a plurality of streams that may be interleaved to form outgoing test traffic 246. The plurality of streams may be portions of a single traffic item or a plurality of traffic items. Each of the streams may include a sequence of packets, which may be divided between a plurality of packet groups. The stream data 232 may include, for example, the type of packet, the frequency of transmission, definitions of fixed and variable-content fields within the packet and other information for each packet stream.

As the traffic generator unit 240 generates the outgoing test traffic 246, transmit traffic statistics may be stored in a transmit traffic statistics memory 244. The stored transmit traffic statistics may include, for example, a count of the number of packets generated for each stream.

The network interface unit 280 may convert the outgoing test traffic 246 from the traffic generator unit 240 into the electrical, optical, or wireless signal format required to transmit the test traffic to the network under test 290 via a link 285, which may be a wire, an optical fiber, a wireless link, or other communications link. Similarly, the network interface unit 280 may receive electrical, optical, or wireless signals from the network over the link 285 and may convert the received signals into incoming test traffic 282 in a format usable to the traffic receiver unit 260.

The traffic receiver unit 260 may receive the incoming test traffic 282 from the network interface unit 280. The traffic receiver unit 260 may include a statistic engine 262 and a statistics memory 264. The statistics engine 262 may identify each received packet as a member of a specific packet group and may extract test data from each packet. The statistics memory 264 may be used to store accumulated traffic statistics for each packet group. The stored statistics for each packet group may include, for example, a total number of received packets, a number of packets received out-of-sequence, a number of received packets with errors, a maximum, average, and minimum latency or propagation delay, and other statistics for each packet group. After each new packet is received, the statistics engine 262 may update the test statistics stored in the statistics memory 264 for the associated packet group.

The traffic receiver unit 260 may also capture and store specific packets in accordance with capture criteria provided by the port processor 230. The traffic receiver unit 260 may provide test statistics and/or captured packets 266 to the port processor 230, for additional analysis during, or subsequent to, the test session.

The outgoing test traffic 246 and the incoming test traffic 282 may be primarily stateless, which is to say that the outgoing test traffic 246 may be generated without expectation of any response and the incoming test traffic 282 may be received without any expectation of a response or intention of responding. However, some amount of stateful, or interactive, communications may be required or desired between the port unit 220 and the network 290 during a test session. For example, the traffic receiver unit 260 may receive control packets, which are packets containing data necessary to control the test session, that require the port unit to send an acknowledgement or response.

The traffic receiver unit 260 may separate incoming control packets 236 from the incoming test traffic and may route the incoming control packets 236 to the port processor 230. The port processor 230 may extract the content of each control packet and may generate an appropriate response in the form of one or more outgoing control packets 238. Outgoing control packets 238 may be provided to the traffic generator unit 240. The traffic generator unit 240 may insert the outgoing control packets into the outgoing test traffic 246.

In this patent, a port unit that generates and transmits traffic will be referred to as a source port unit. A port unit that receives traffic will be referred to as a destination port unit. A port unit connected to a network test may function as both a source port unit and a destination port unit.

Figure 3:
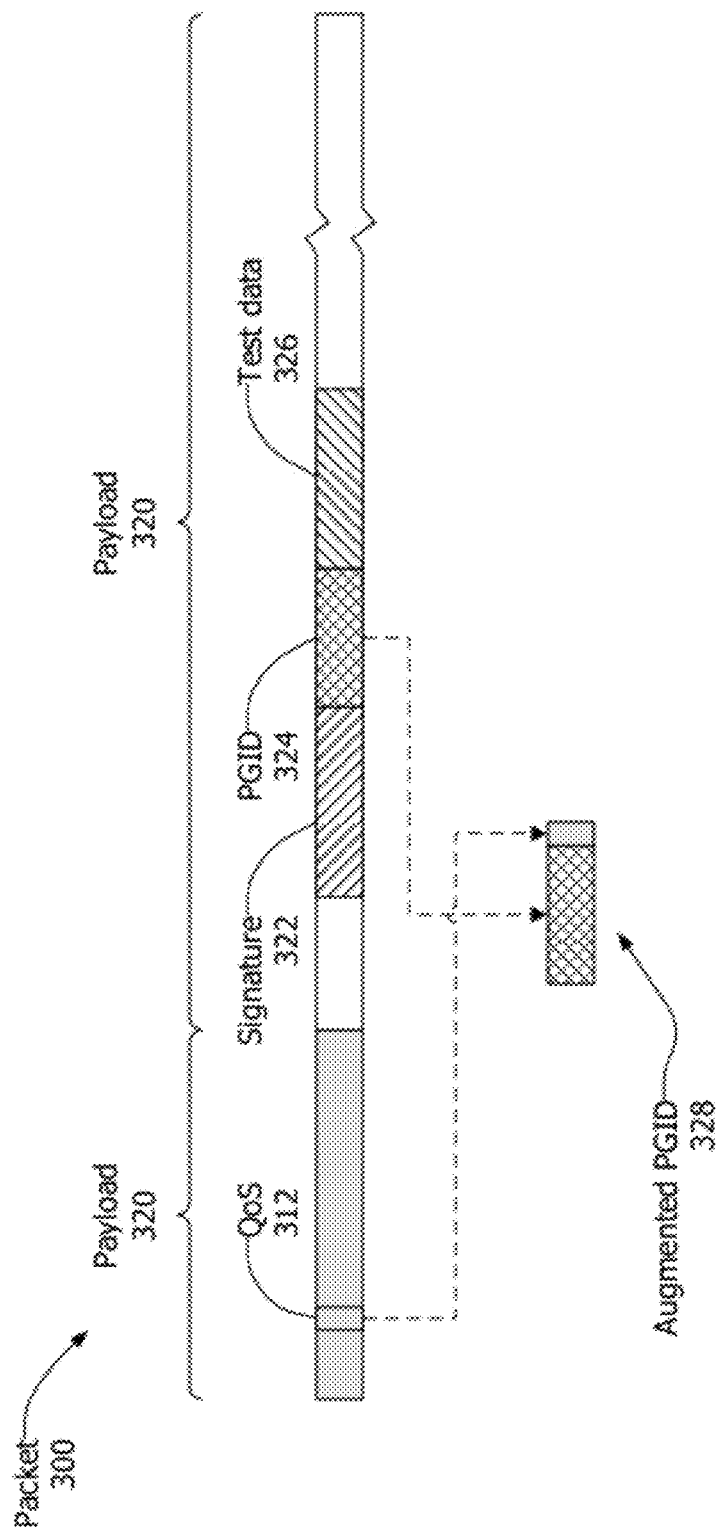
FIG. 3 is a graphical representation of a packet.

Referring now to FIG. 3, a representative packet 300 may include a header 310 and a payload 320. The header 310 may include a plurality of cascaded headers corresponding to sequential communications protocol layers. For example, the header 310 may include a layer two header, such as a Media Access Control header; a layer three header, such as an Internet Protocol header; and a layer four header, such as a Transmission Control Protocol or User Datagram Protocol header. In some cases, such as packets representing traffic on a virtual local area network, one or more encapsulation headers may be disposed between the layer two header and the layer three header. When a network under test utilizes multiprotocol label switching (MPLS), one or more MPLS labels may be disposed between the layer two header and the layer three header. In addition, the header 310 of the packet 300 may be changed during transmission through a network, for example by the addition or removal of MPLS labels, tunneling protocol headers, and/or IP.v6 extension headers. Thus a substantial amount of processing may be required to parse and interpret the various fields within the header 346.

To allow a packet receiver unit to determine if a received packet is part of a test session, and to enable the packet receiver to extract test data from a received packet without parsing the entire header portion of the packet, the packet 300 may include a signature 322, a PGID 324 and test data 326. The test data 326 may include, for example, a sequence number of the packet within a packet group defined by the PGID and/or a timestamp. The signature 322, the PGID 324 and the test data 326 may commonly be placed in the payload 348. A traffic receiver may locate the signature 322 within a received packet by performing a floating comparison or pattern match against the known value of the test signature, as described in Published Application US 2007/0115833 A1. Once the signature is located, the traffic receiver unit may locate and extract the PGID 324 and test data 326 based on the known position of these fields in relationship to the signature 322. As shown in FIG. 3, the PGID 324 and the test data field 326 may follow immediately after the signature 322.

In some circumstances, a user may want to collect test data indicating changes made to packets as they are transmitted through a network under test. In particular, a network may modify a quality of service (QoS) or type of service (ToS) field within the headers of at least some packets. To maintain traffic statistics including data indicating changes made to one or more header fields, a traffic receiver may collect and store traffic statistics based on an augmented PGID 328. The augmented PGID may include, for example, the PGID 324 from the packet payload 320 and all or a portion of a QoS field 312 or other field from the packet header. U.S. Pat. No. 7,643,431 describes methods and apparatus for generating a PGID from two or more fields of a packet.

Figure 4B:
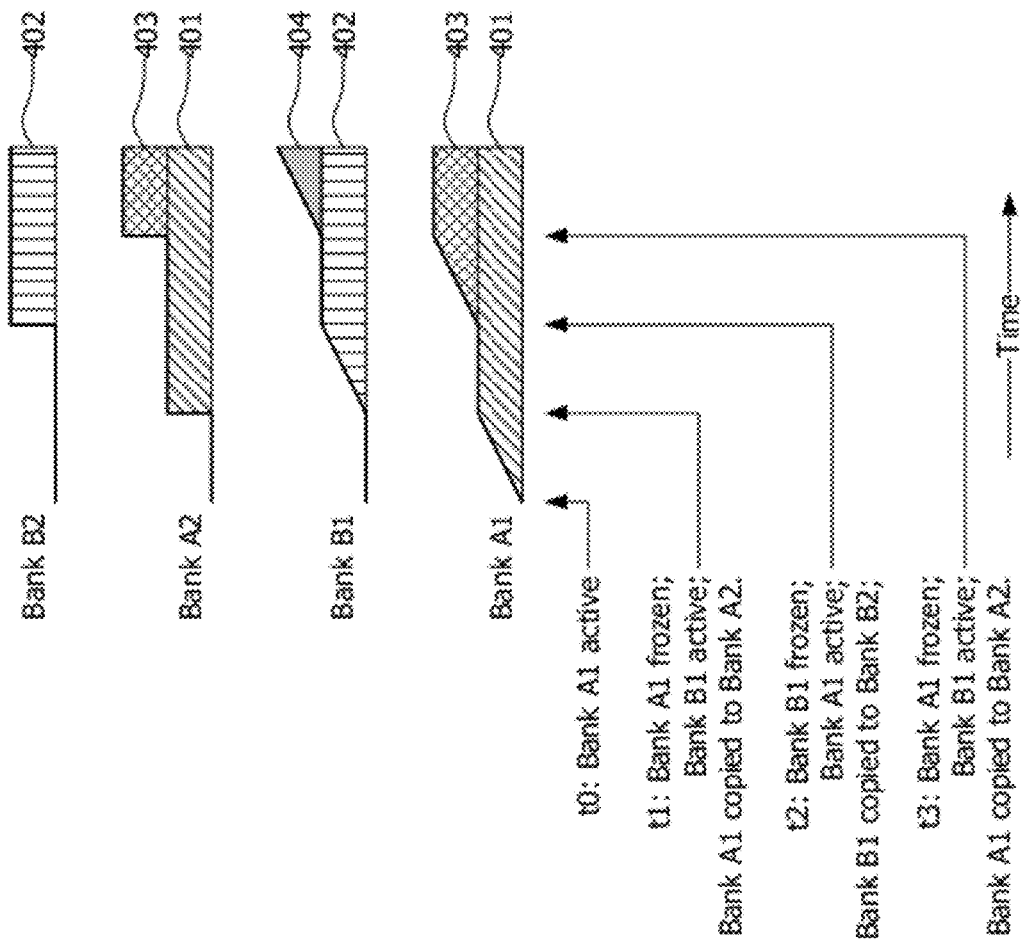
FIG. 4B is a timing diagram illustrating the operation of the statistics memory of FIG. 4A.
Figure 4A:
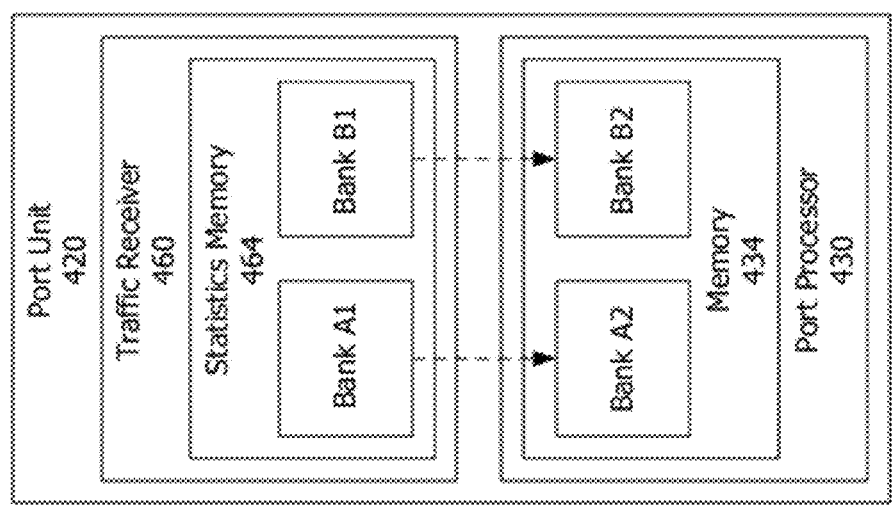
FIG. 4A is a block diagram of a statistics memory.

Referring now to FIG. 4A, a port unit 420, which may be port unit 220, may include a traffic receiver 460 and a port processor 430. The traffic receiver 460 may include a statistics memory 464 for storing statistics on the incoming traffic received at the port unit 420. The statistics memory 464 may be divided into two separately-accessible memory banks A1, B1. The port processor 430 may include a memory 434 which may include two memory banks A2, B2.

As shown in the exemplary timing diagram of FIG. 4B, the memory banks A1, B1, A2, and B2 may allow traffic statistics to be accumulated continuously while allowing concurrent near real-time analysis of the traffic statistics. From a time t0 to a time t1, traffic statistics 401 may be accumulated in memory bank A1 within the port unit 420. At time t1, memory bank A1 may be frozen and memory bank B1 may be activated to accumulate traffic statistics 402. Immediately after time t1, all or portions of the accumulated traffic statistics 401 may be copied from memory bank A1 to memory bank A2 within the port processor 430. The port processor 430 may then aggregate, analyze, and/or report the accumulated traffic statistics 401. The time t0 may be, for example, the start of a test session.

From time t1 to a time t2, traffic statistics 402 may be accumulated in memory bank B1 within the port unit 420. At time t2, the functions of the memory banks A1 and B1 may be reversed. Memory bank B1 may be frozen and memory bank A1 may be activated to accumulate traffic statistics 403. Note that traffic statistics 403 are accumulated along with traffic statistics 401, which remain in memory bank A1. Immediately after time t2, all or portions of the accumulated traffic statistics 402 may be copied from memory bank B1 to memory bank B2 within the port processor 430. The port processor 430 may then aggregate, analyze, and/or report the accumulated traffic statistics 401 and 402 which are stored in memory banks A2 and B2 respectively.

From time t2 to a time t3, traffic statistics 403 may be accumulated in memory bank A1 within the port unit 420. At time t3, the functions of the memory banks A1 and B1 may again be reversed. Memory bank A1 may be frozen and memory bank B1 may be activated to accumulate traffic statistics 404. Note that traffic statistics 404 are accumulated along with traffic statistics 402, which remain in memory bank B1. Immediately after time t3, all or portions of the accumulated traffic statistics 403 may be copied from memory bank A1 to memory bank A2 within the port processor 430. The port processor 430 may then aggregate, analyze, and/or report the accumulated traffic statistics 401 and 403 which are stored in memory bank A2 and accumulated traffic statistics 402 which are stored in memory bank B2 respectively.

The time intervals between time t0, time t1, time t2, and time t3 may be a predetermined capture period. The capture period may be set by a test administrator coupled to the port unit 420. The test administrator may set the capture period to ensure that the transfer of data between the memory banks and the required aggregating, analyzing, and/or reporting by the port processor can be completed within the capture period.

The time intervals between time t0, time t1, time t2, and time t3 may be determined by operator requests to view test data. For example, time t0 may be the start of a test session and times t1, t2, and t3 may be respectively associated with first, second, and third operator requests to view specific test data.

As shown in FIG. 4B, either memory bank A1 or B1 is alternately available for the traffic receiver 460 to continuously accumulate traffic statistics. Simultaneously, all of the traffic statistics accumulated up to the last time the memory banks A1/B1 were switched is available in memory banks A2 and B2 for analysis by the port processor 430.

Dividing the statistics memory 464 and port processor memory 434 into two banks is not necessary to accumulate and report traffic statistics. For example, if the statistics memory 464 and the port processor memory 434 each have a single bank, the aggregation and display of test statistics may simply be delayed until the test session has been completed. To allow analysis and display of test statistics during a test session, the test session may be briefly suspended while test statistics are transferred from the statistics memory 464 to the port processor memory 434. Alternatively, the accumulation of test statistics may be continued while test statistics are transferred from the statistics memory 464 to the port processor memory 434, with the understanding that the transferred statistics may not represent a single specific instant in time.

Description of Processes

Figure 5:
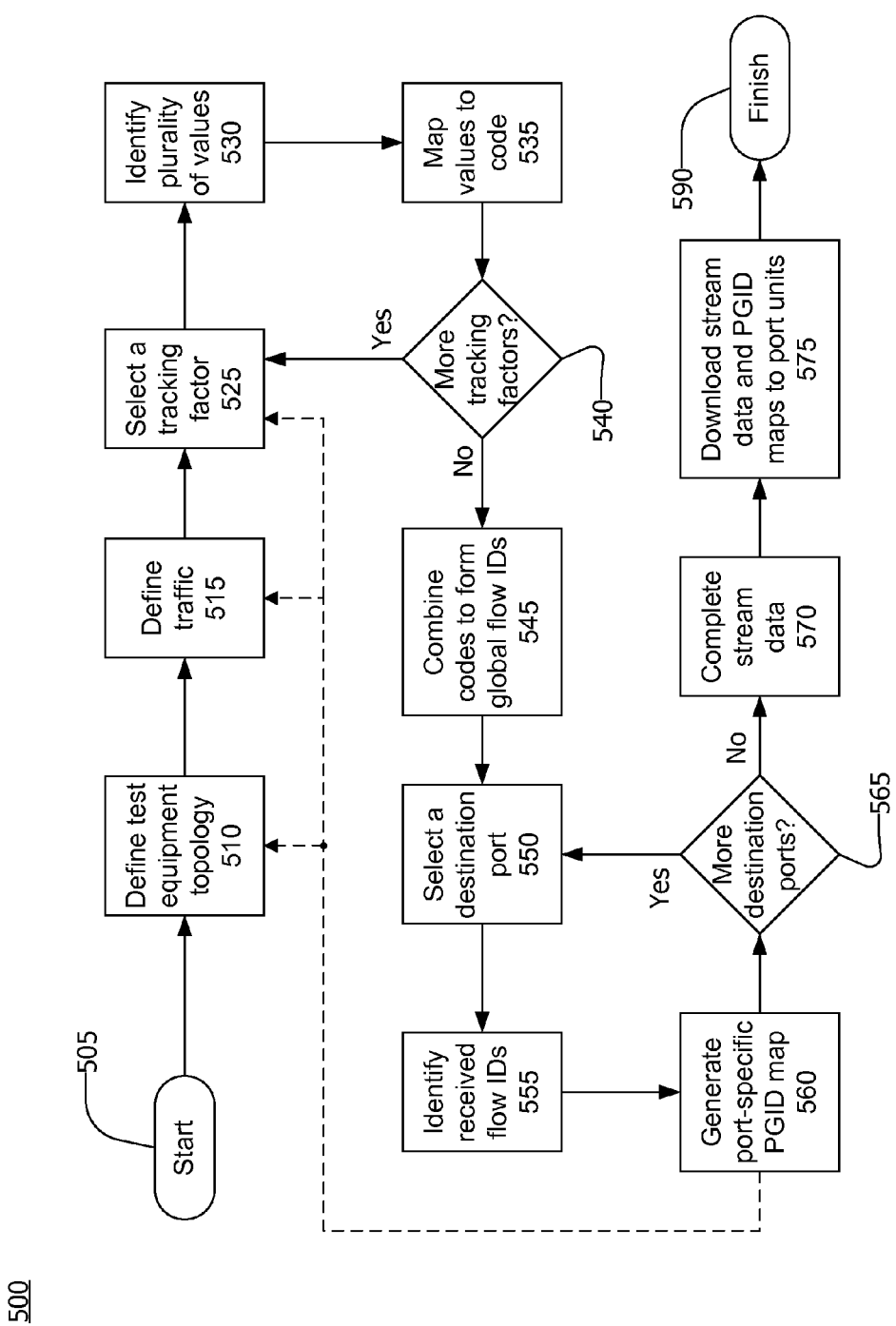
FIG. 5 is a flow chart of a process for designing a network test session.

Referring now to FIG. 5, a process 500 for designing a network test session may start at 505 and may finish at 590. For the purpose of discussion, an assumption is made that the network to be tested uses internet protocol (IP) and IP addresses. However, the process 500 may be applied to designing test session for networks using other protocols and address schemes.

The process 500 may be done, for example, by a test administrator computing device, such as the test administrator 205, coupled to one or more port units, such as the port unit 220. The test administrator computing device may be supervised by one or more test engineers or other operators who may provide inputs to automated tools that perform at least part of the process 500.

The process 500 for designing a network test session may begin by defining a test equipment topology at 510. Defining the test equipment topology at 510 may include determining how many test ports will be involved in the test session and where each test port will connect to the network. Defining the test equipment topology at 510 may also include defining what each test port will emulate during the test session. Each test port may emulate as little as a single IP address and as much as an entire network encompassing a large plurality of IP addresses. Additionally, defining the test equipment topology at 510 may include defining control packets that will advertise each test port to routers, switches, and other devices within the network using one or more routing protocols such as Border Gateway Protocol, Exterior Gateway Protocol, Open Shortest Path First Protocol, Resource Reservation Protocol and other routing protocols.

At 515 the test traffic to be generated during the test session may be defined. The test traffic may include one or more traffic items. Each traffic item may effectively be a separate test of the network. Each traffic item may be defined as a plurality of streams. Each stream may be described by stream data that defines attributes of the stream such as source port; transmission frequency; fixed and variables fields of the packets in the stream such as, for example, protocol or type of packet, source and destination IP addresses, type of service, and payload content; and other characteristics of each packet in the stream.

An extensive test of a complex network may include thousands of streams comprising a million or more flows. Since it is not possible for a test operator to evaluate or understand a million flows during a test session, tracking factors, or parameters that may be used to categorize and consolidate test statistics, may be defined for each traffic item at 525-540. Tracking factors may include fields within each packet, such as source IP address, destination IP address, type of service, protocol, and other fields. Tracking factors may include information associated with each packet but not included within the packet, such as, for example, source port unit and destination port unit.

As previously discussed, each packet to be generated may include a PGID to identify the packet as a member of a packet group, and traffic statistics may be accumulated for each PGID. To allow the traffic statistics to be sorted, aggregated, and reported based on the defined tracking factors, each PGID value may correspond to a unique combination of values for the tracking factors. In some circumstances, a PGID also may contain information not associated with tracking factors.

Figure 6:
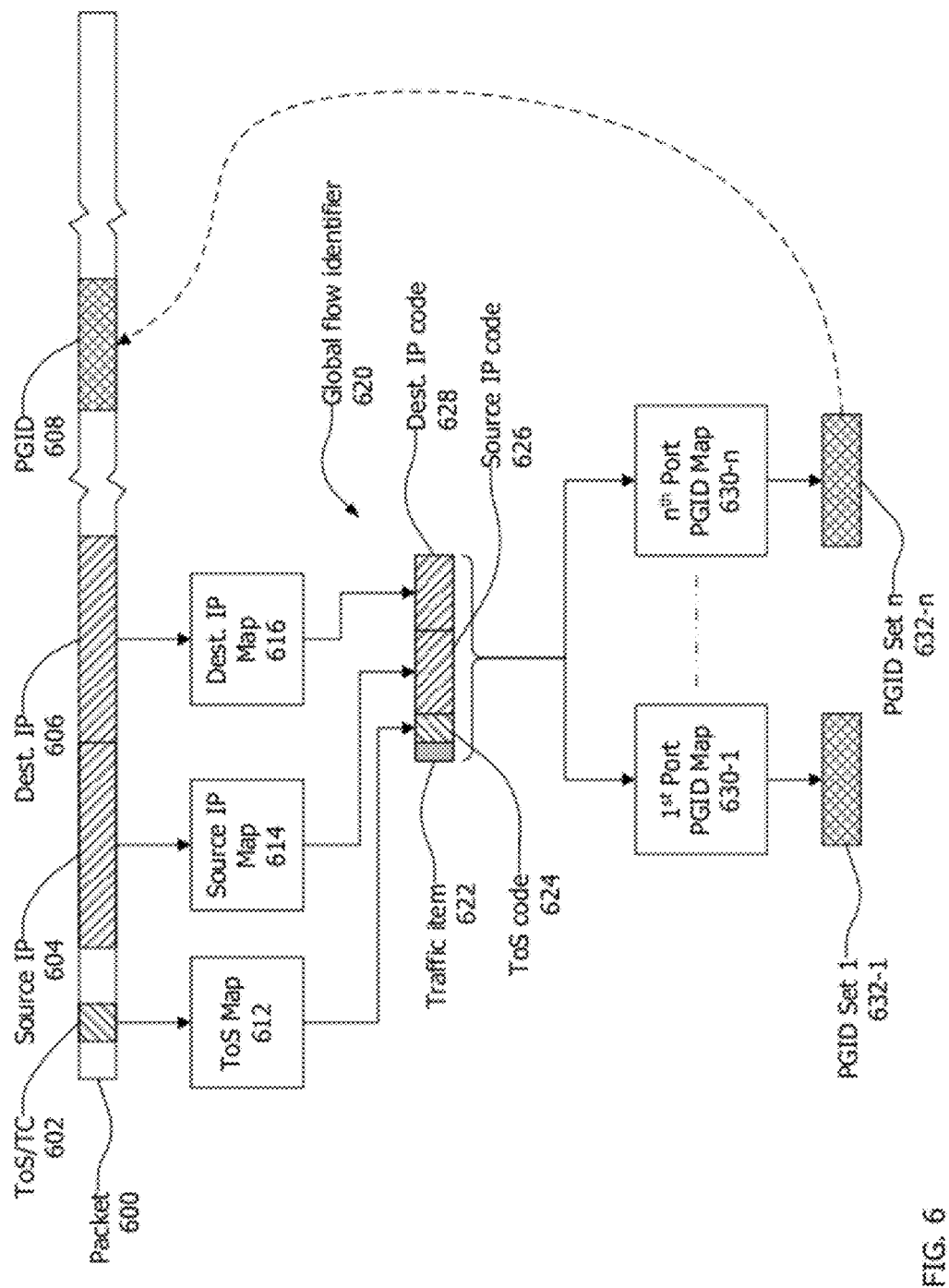
FIG. 6 a schematic representation of a process for defining PGIDs.

The rationale and method for mapping tracking factors to PGIDs can be understood with reference to FIG. 5 and with reference to an example presented in FIG. 6. In the example of FIG. 6, an IP.v4 packet 600 includes a type of service (ToS) field 602, a source IP address field 604 and a destination IP address field 606 which have been defined, at 520, as tracking factors. Additionally, the example of FIG. 6 assumes that the test session includes four traffic items, and a traffic item identifier 622 is automatically defined to be one of the tracking factors.

The actions from 525 through 540 may be repeated for each tracking factor. At 525, a first tracking factor may be selected. At 530, a plurality of values of the selected tracking factor that will actually be used during the test session may be identified. The plurality of values may be identified, for example, by searching the stream data defined at 515. At 535, the plurality of actual values may be mapped or compressed to a code associated with the selected tracking factor. The length of the code may be the minimum number of bits necessary to identify each of the plurality of actual values for the tracking factor.

In the example of FIG. 6, the ToS field 602 of an IPv4 packet is 8 bits in length and thus has 256 possible values. However, during a test session less than all of the 256 possible values for ToS field may be used. The number of values for the ToS field may be determined, at 530, by analyzing all of the stream data defined at 515. In the example of FIG. 6, an assumption is made that only 8 of the 256 possible ToS values are actually used in the test traffic for a specific test item. Thus the ToS values that are actually used may be mapped, at 535, to a ToS code 624 having only 3 bits. The mapping from the eight actually used 8-bit values of the ToS field 602 to the 3-bit ToS code 624 may be done using a ToS map 612. The ToS map 612 may be a look-up table or other data structure that uniquely relates each actual ToS field value with a corresponding ToS code value.

Similarly, the header of the exemplary packet 600 includes a 32-bit source IP address field 604 and a 32-bit destination IP address field 606, each defining about 4.3 billion discrete IP addresses. However, during a test session only a small fraction of the source and destination IP addresses may be used. Further, since at least some of the test ports connected to the DUT may represent networks rather than discrete addresses, a least significant portion, such as a least significant byte or two least significant bytes, of some IP addresses may not be used to differentiate packet groups during a test session. Thus the number of source and destination IP address values that may be tracked during a test session may much smaller than 4.3 billion.

The source and destination IP address values to be tracked during the test session (as identified at 530) may be mapped (at 535) to respective codes 626, 628 by respective maps 624, 626. For example, 500 source IP address values may be mapped to a 9-bit source IP code 624 by the source IP map 614. For further example, 250 destination IP address values may be mapped to an 8-bit destination IP code 626 by the destination IP map 616.

When the values for all of the selected tracking factors have been mapped to respective codes (at 525-540), the codes may be combined at 545 to form global flow identifiers (IDs). In this context, the term "global" means used everywhere, or used by all port units. Continuing the example of FIG. 6, the ToS code 624, the source IP code 626, and the destination IP code 628 may be combined with a traffic item identifier 622 to form a global flow ID 620. In this example, the global flow ID 622 includes two bits for the traffic item identifier 622, three bits for the ToS code 624, nine bits for the source IP code 626, and eight bits for destination IP code 628, for a total of 22 bits. Each value of the global flow ID 620 may correspond to a unique combination of values for the selected tracking factors. More specifically, each value for the global flow ID 620 can be associated with a specific traffic item, a specific ToS, a specific source IP address, and a specific destination IP address.

Continuing the example of FIG. 6, a 22-bit global flow ID has a capacity to uniquely identify over 4 million packet groups. In an ideal situation, each destination port unit used during the exemplary test session will have the memory capacity (in each of two memory banks, as discussed with respect to FIG. 4A) to accumulate test statistics on over 4 million different packet groups. In this case, the 22-bit global flow ID may simply be inserted into each packet generated during the test session. However, in a real test environment, it may be impractical or unaffordable to provide this large memory capacity at each port unit. Thus the traffic may be defined such that the number of flows sent to each of the receive port does not exceed the capacity of the ports.

At 550 a destination port may be selected from a plurality of destination ports defined at 510. At 555, the global flow IDs of the packets that will be received at the selected port may be identified. At 560, the global flow IDs identified at 555 may be mapped, or compressed, to a port-specific set of PGIDs by a port-specific PGID map.

For example, a selected destination port may receive 100,000 different flows during a test session, each associated with a unique 22-bit global flow ID. In this case, the 100,000 22-bit global flow IDs may be uniquely mapped to 100,000 17-bit PGIDs for use exclusively in packets sent to the selected destination port. The actions from 550 to 565 may be repeated for each destination port to develop a corresponding PGID map and a corresponding set of PGIDs. Each PGID value may correspond to a single global flow ID value. Since each global flow ID value corresponds to a unique combination of values for the selected tracking factors, each PGID value also may be associated with a specific combination of values for the selected tracking factors.

The PGID map and the set of PGIDs may be different for each destination port. However, a multicast packet can have only a single PGID value. Thus, the global flow ID of a multicast packet flow may be mapped to the same PGID value in the PGID maps of all destination ports that receive the multicast packet flow.

In some circumstances, it may not be possible to generate, at 560, an acceptable port-specific PGID map for one or more ports. For example, mapping 100,000 global flow IDs to 100,000 17-bit PGIDs is not satisfactory if the destination port only has memory capacity to accumulate traffic statistics for 50,000 packet groups. In such a situation, the process 500 may return to 510, 515, or 525 to change the test equipment topology, to redefine the traffic, or to select different tracking factors. The process 500 may repeat iteratively as needed to arrive at an acceptable PGID map for each destination port.

In the example of FIG. 6, the set of 22-bit global flow IDs 620 may be mapped by a first port PGID map 630-1 to a first set of PGID values 632-1. A PGID selected from the first set of PGID values 632 may be incorporated into every packet received at the first destination port. Similarly, the set of 22-bit global flow IDs 620 may be mapped by an $n^{th}$ port PGID map 630-n to an $n^{th}$ set of PGID values 632-n. A PGID selected from the $n^{th}$ set of PGID values 632-n may be incorporated into every packet received at the $n^{th}$ destination port.

When an acceptable PGID may and corresponding set of PGID values have been defined (at 550-565) for each destination port, the stream data defined, at least in part, at 515 may be completed at 570 by adding appropriate PGID data to each stream definition. At 575, the stream data may be downloaded to the source ports defined at 510, and the PGID maps generated at 550-565 may be downloaded to corresponding destination ports. After the stream data and maps are downloaded, the process 500 for designing a test session may end at 590.

Figure 7:
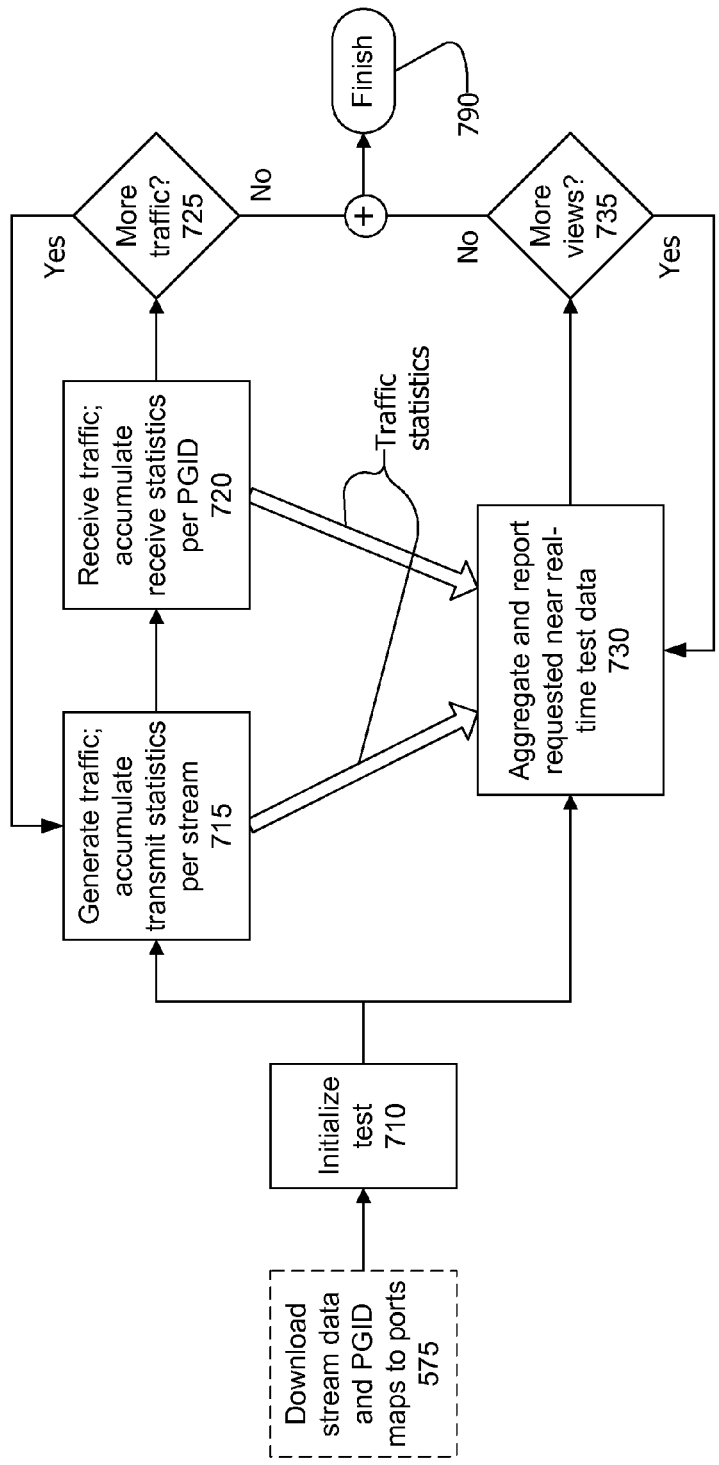
FIG. 7 is a flow chart of a process for testing a network.

Referring now to FIG. 7, a process 700 for testing a network may be performed by a test administrator, such as the test administrator 205, coupled to a plurality of port units such as the port unit 200. Each port unit may include a traffic generator, a traffic receiver, and a port processor. Each traffic receiver may accumulate traffic statistics in a statistics memory which may have two memory banks. If present, the two statistics memory banks in each traffic receiver may be used to accumulate traffic statistics alternately, as described in conjunction with FIG. 4A and FIG. 4B. The process 700 may be cyclic in nature and may repeat continuously for the duration of a test session.

The process 700 may begin after the port units have received stream data and PGID maps, for example from a test session design process such as 575 in the test session design process 500. At 710, the test session may be initialized to logically connect the IP addresses represented by the port units to the network under test. Initializing the test session may include the port units advertising their presence to the network under test using one or more routing protocols such as Border Gateway Protocol, Exterior Gateway Protocol, Open Shortest Path First Protocol, Resource Reservation Protocol and other routing protocols. Initializing the test session may also include the port units negotiating communications parameters, for example MPLS labels, with the network under test.

After the port units are logically connected to the network under test at 710, test traffic may be generated by one or more source ports units at 715 and received by one or more destination port units at 720. The test traffic may include one or more traffic items. Each traffic item may include a plurality of streams and each stream may include a large plurality of flows. Test traffic may be generated simultaneously by a plurality of source port units at 715. The test traffic generated by each source port unit may include a plurality of interleaved streams and flows. At 715, each port unit may also accumulate transmit traffic statistics, including at least a number of packets transmitted for each stream. Test traffic may be received simultaneously by a plurality of destination port units at 720. Each destination port unit may accumulate received traffic statistics for packet groups identified by a PGID or an augmented PGID extracted from each received packet. The source port units and the destination port units may continuously generate and receive test traffic until a determination is made at 725 that all required test traffic has been transmitted.

At 730, an operator may request and view near real-time test data. In this patent, the term "near real-time" means current except for a processing delay that is small with respect to the overall duration of a test session. Near real-time test data may be, for example, delayed by a period of a few seconds to a few minutes. Near real-time test data may be reported or viewed at 730 concurrently with and/or after traffic statistics are accumulated at 715 and 720. The actions at 730 cannot be performed until at least some traffic statistics have been accumulated at 715 and 720. The actions at 730 may not be performed until an operator has entered a request to view specific test data. The test data requested and viewed at 730 may include transmit traffic statistics accumulated at 715 and/or received traffic statistics collected at 720.

Requesting and viewing test data at 730 may be cyclic in nature. The actions at 730 may be repeated each time an operator enters a new request to view test data. The actions at 730 may be periodic and may be repeated at regular time intervals. The time interval at which 730 is repeated may be synchronized with switching statistics memory banks within port units, as described in conjunction with FIG. 4A and FIG. 4B. The actions at 730 may be repeated periodically until a determination is made, at 735, that no additional test data views are required. The process 700 may finish at 790 when no additional traffic or test data views are required.

Figure 8:
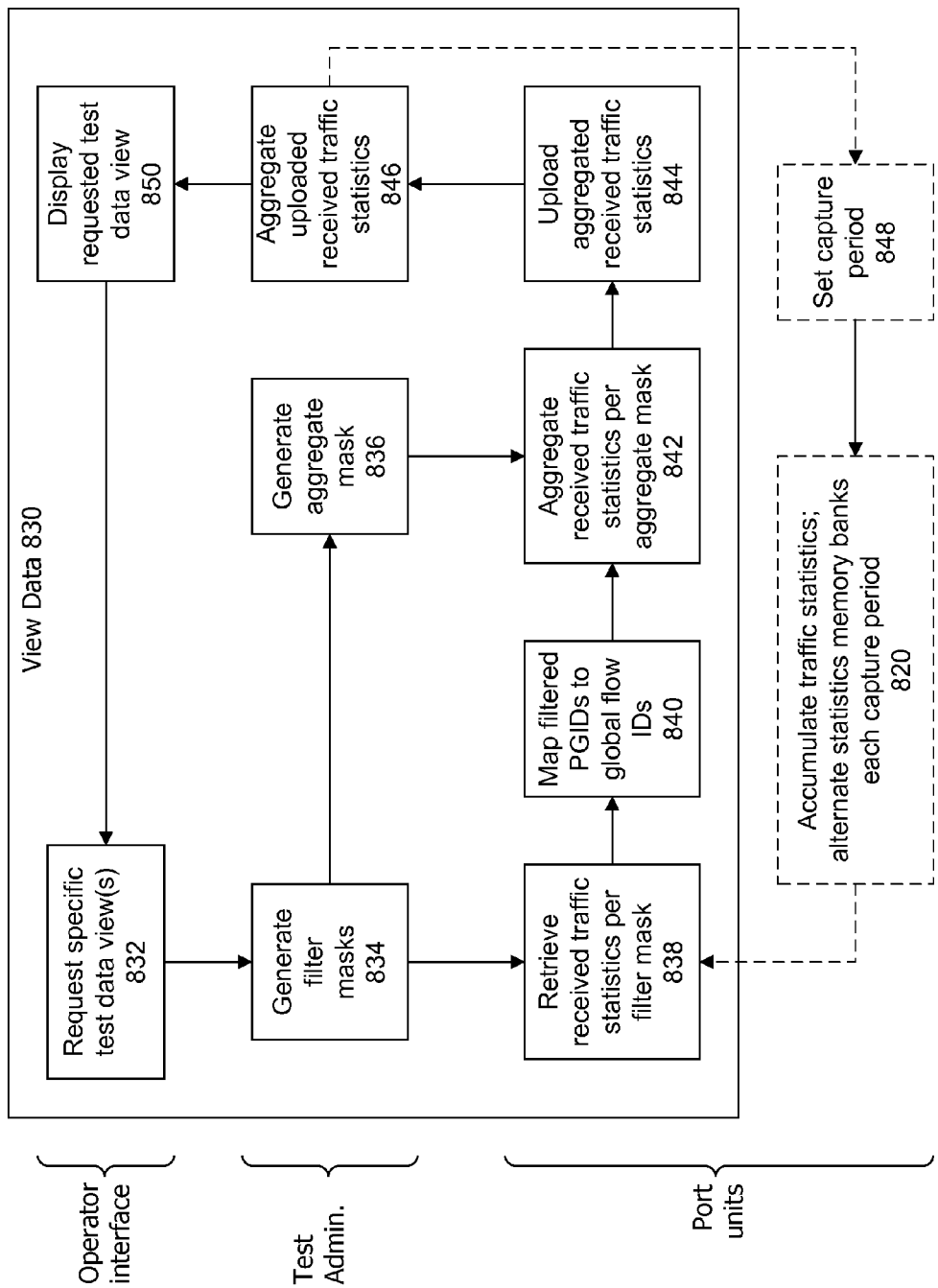
FIG. 8 is a flow chart of a first portion of a process for displaying selected test data.

FIG. 8 shows a flow chart of a process 830 for viewing received traffic statistics that may be suitable for use as a portion of action 730 in FIG. 7. The process 830 will be explained in conjunction with an example shown in FIG. 9. In the following description, reference designators from 830 to 850 refer to FIG. 8 and reference designators from 910 to 940 refer to FIG. 9.

The process 830 may be performed by an operator interface coupled to a test administrator computing device which is, in turn, coupled to a plurality of port units. The process 830 may be done concurrently with the accumulation of traffic statistics at 815 and 820. At 820, accumulated traffic statistics may be stored in a statistics memory having two banks that are used alternately as described in conjunction with FIG. 4A and FIG. 4B.

At 832, an operator may enter one or more requests to view specific data via an operator interface coupled to the test administrator computing device. For example, the operator may enter the requests using a graphic user interface presented on a display device of the operator interface. Each request may identify one more tracking factors to be used to aggregate and organized the requested data.

In response to the requests entered at 832, the test administrator may configure the port units to provide received traffic statistics requested at 832. The test administrator may configure the port units by sending each port unit configuration data. The configuration data may include, for example, a filter mask indicating what received traffic statistics are required, one or more aggregate masks indicating how the received traffic statistics should be summarized, and other information.

At 834, the test administrator may determine the specific received traffic statistics required to satisfy the requests entered at 832. The test administrator may generate a unique filter mask for each destination port unit. For example, each filter mask may be a bit string having a single bit corresponding to each port-specific PGID. Each bit of the filter mask may indicate if the received traffic statistics accumulated for corresponding PGID are, or are not, required to satisfy the requests entered at 832. At 834, the filter masks may be transmitted to the respective destination port units. The filter masks may include a substantial number of bits (a filter mask for a port unit that accumulates received traffic statistics for 100,000 PGIDs may require 100,000 bits). Long filter masks may be compressed, for example by run-length encoding, for transmission by the test administrator and subsequently decompressed at the respective destination port units. When two or more test data views are requested at 832, the filter masks generated and transmitted to the destination port units may indicate the received traffic statistics required for all of the requested test data views in combination.

At 836, the test administrator may generate an aggregate mask corresponding to each requested test data view. The one or more aggregate masks may be common to all destination port units. The aggregate masks may define which global flow ID fields are to be used to aggregate and present the received traffic statistics requested at 832. The aggregate masks may also be transmitted to the destination port units at 836.

In this patent, the term "aggregate" has the broad meaning of "to collect or combine into a whole". The exact mathematical operations involved in aggregating traffic statistics may depend on the nature of the statistics. For example, a number of received packets may be accumulated for each PGID. To aggregate the number of received packets for a plurality of PGIDs, the number of packets received for each of the plurality of PGIDs may simply be summed to provide the aggregate number of packets received. For further example, a maximum latency time may be accumulated for each PGID. To aggregate the maximum latency time for a plurality of PGIDs, the maximum latency for each PGID may be mutually compared and the single largest value may be selected as the aggregate maximum latency.

Figure 9:
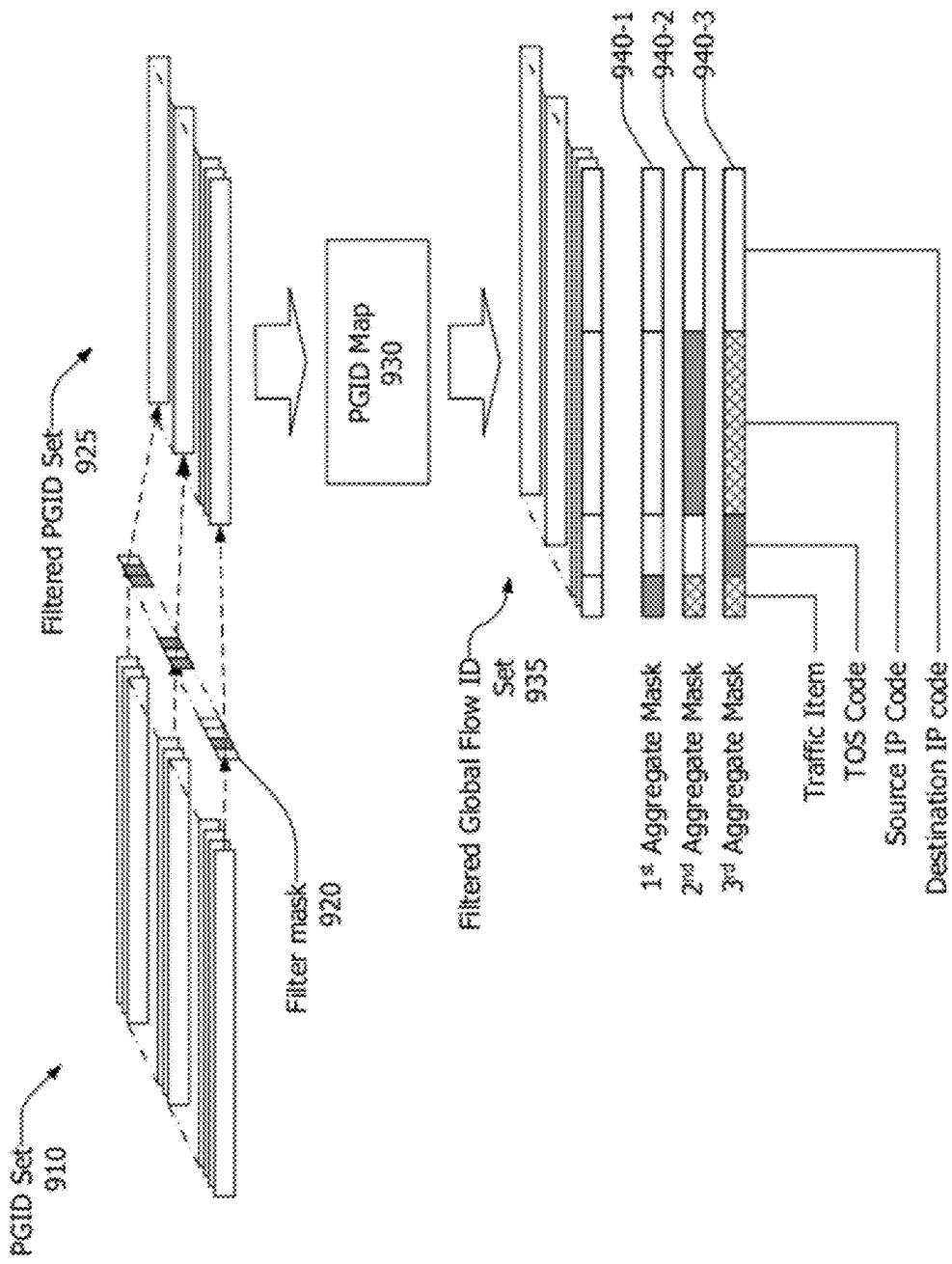
FIG. 9 is a graphical representation of the process for displaying selected test data.

At 838, a port processor within each port unit may retrieve received traffic statistics from the statistics memory in accordance with the respective filter mask. As shown in FIG. 9, each port unit may accumulate received traffic statistics for a set of PGIDs 910. A filter mask 920 may contain a single bit for each PGID indicating if the received traffic statistics associated with the corresponding PGID are, or are not, required to provide the test data requested at 832. The PGID set 910 may be filtered by the filter mask 920 to provide a filtered PGID set 925. Referring back to FIG. 8, the port processor may retrieve the received traffic statistics associated with each PGID of the filtered PGID set at 838.

The PGID values in received packets may be assigned in a manner that does not provide for immediate correlation of a PGID with values for tracking factors. At 840, each PGID of the filtered PGID set 925 may be mapped to a filtered global flow ID set 935. Each PGID of the filtered PGID set 925 may be mapped to a corresponding global flow ID using a port-specific PGID map 930, such as the port specific PGID maps 630-1, 630-n shown in FIG. 6. Each global flow ID may include fields or codes corresponding to a plurality of tracking factors. Continuing the example of FIG. 6, each global flow ID of the filtered global flow ID set 935 may include, for example, separate fields corresponding to traffic item, ToS/TC, source IP address, and destination IP address.

At 842, each port unit may aggregate the received traffic statistics associated with the filtered global flow IDs in accordance with the aggregate mask provide by the test administrator at 836. The aggregate mask may identify one or more fields of the filtered global flow IDs to be used for sorting and reporting traffic statistics. For example, the $1^{st}$ aggregate mask 940-1 shown in FIG. 9 identifies (dark shading) the traffic item field. This mask may cause each port units to sort the received traffic statistics associated with the filtered global flow IDs in accordance with the value of the traffic item field and then aggregate the received traffic statistics for all global flow IDs having the same traffic item value. The $2^{nd}$ and $3^{rd}$ aggregate masks 940-2 and 940-3 will be discussed subsequently in conjunction with the discussion of FIG. 11.

At 844, the aggregated received traffic statistics may be uploaded from each port unit to the test administrator. Continuing the previous example, one set of received traffic statistics corresponding to each value of the traffic item field may be uploaded from each port unit to the test administrator. At 846, the test administrator may aggregate the received traffic statistics received from the port units.

At 850, the test administrator may present the aggregated received traffic statistics from 846 via the operator interface. The aggregated traffic statistics may be presented to an operator via a test data view on a display device within the operator interface. The aggregated received traffic statistics may also be printed, transmitted via a network, stored, and/or reported in some other manner.

At 848, the test administrator may set or update the capture period used by the port units to determine when to swap statistics memory banks. The capture period may be set to a time just longer than the processing time required at 838 through 846, such that the test data reported at 850 may be updated as often as possible within the limitations of the test administrator and port devices.

The entire process 830 may be cyclic in nature. The actions from 838 through 850 may be repeated each time the port swap statistics memory banks, or once each capture period. The actions at 832 through 836 may be repeated each time a new test data view is requested.

Figure 10:
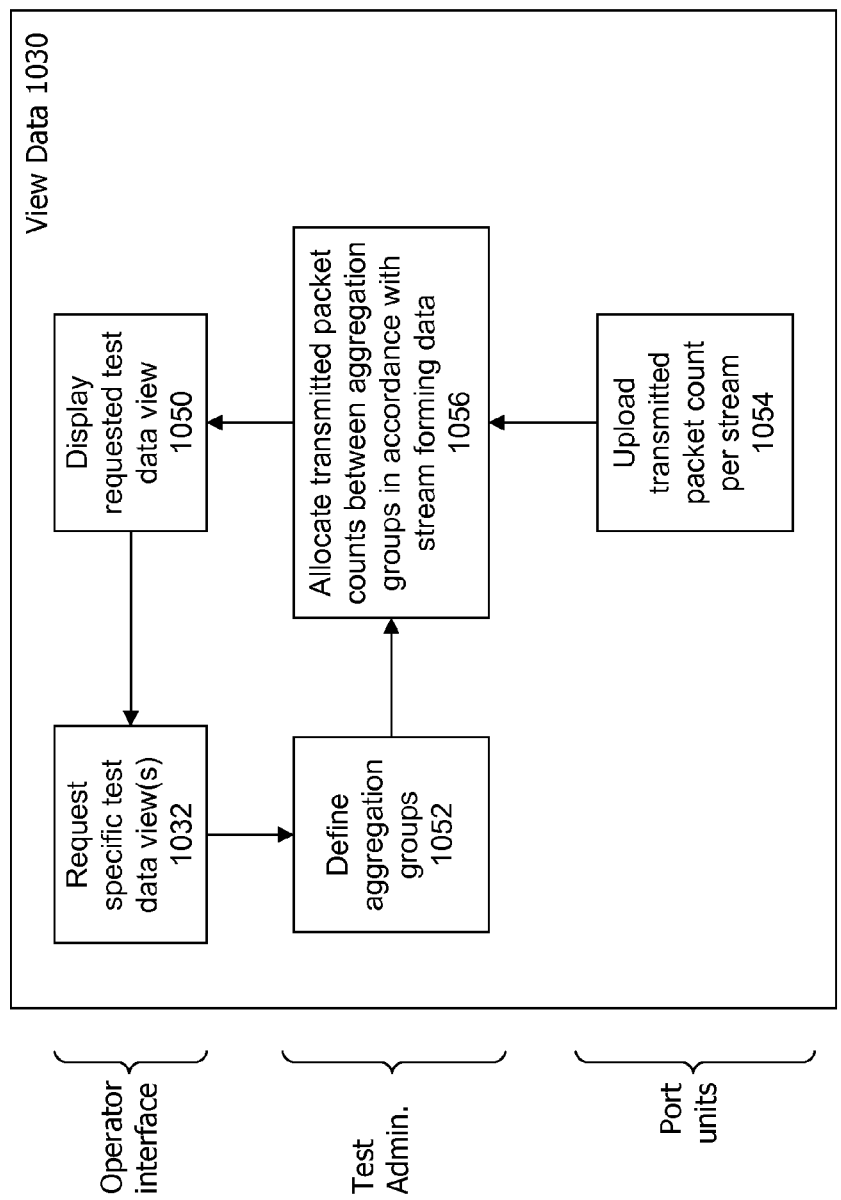
FIG. 10 is a flow chart of a second portion of a process for displaying selected test data.

FIG. 10 shows a flow chart of a process 1030 for viewing transmit traffic statistics that may be suitable for use as a second portion of action 730 in FIG. 7. The process 1030 may be performed by an operator interface coupled to a test administrator computing device which is, in turn, coupled to a plurality of port units. The process 1030 may be performed concurrently with the accumulation of traffic statistics at 815 and 820 and concurrently with the process 830 for reporting of received traffic statistics as shown in FIG. 8.

At 1032, an operator may enter one or more requests to view specific data via an operator interface coupled to the test administrator computing device. For example, the operator may enter the requests using a graphic user interface presented on a display device of the operator interface. Each request may identify one more tracking factors to be used to aggregate and organized the requested data.

In response to the requests entered at 1032, at 1054 the test administrator may define a plurality of aggregation groups for aggregating transmit traffic statistics accumulated, for example at 715 in FIG. 7, by transmit port units. An "aggregation group" is a group of traffic statistics that should be aggregated in response to a specific test data view requested at 1032. The aggregation groups may be defined, for example, by traffic item, IP source and/or destination address, source and/or destination port unit, source and/or destination TCP port, quality or type of service, other factors, and combinations of factors. Test data may commonly be displayed, printed, and otherwise reported in tabular form and the aggregation groups may correspond, for example, to the rows of a table. Displaying and reporting test data in tabular form will be subsequently discussed in further detail in conjunction with FIG. 11.

At 1054, transmit traffic statistics, including transmitted packet counts per stream, may be uploaded from one or more port units to the test administrator computing device. At 1056, the transmitted packet counts from 1054 may be allocated among the aggregation groups. Allocation of transmitted packet counts between aggregation groups may be done, for example, by the test administrator computing device executing a software application that analyzes the stream forming data for each stream to determine what portion of the packets in each stream belong to each of the aggregation groups defined at 1052.

For example, assume that a user has requested a test data view consisting of the number of packets transmitted by each source port unit. In this case, the allocation groups would correspond to respective port units and, at 1056, all of the packets transmitted form a given port unit would be allocated to the corresponding aggregation group.

For a more realistic example, assume that the user request a test data view consisting of test statistics by traffic item. In this case, at 1056, the stream forming data for every packet stream would be analyzed to determine what portion of the transmitted packets in that stream should be allocated to each aggregation group. For example, at 1056, the analysis of the stream forming data for a given steam may determine that the stream consists of a sequence of 100 packets that are repeated cyclically. The analysis at 1056 may further determine that the 100 packets in the repeated sequence are uniformly divided between 5 aggregation groups. In this case, if the total transmitted packet count for the stream is 2000 packets, a count of 400 packets would be allocated to each of the five aggregation groups. The analysis and allocation process may be repeated similarly for every packet stream until all of the transmitted packet counts have been allocated among the aggregation groups.

At 1050, the test administrator may present the aggregated transmit traffic statistics from 1046 via the operator interface. The aggregated transmit traffic statistics may be presented to an operator via a test data view on a display device within or coupled to the operator interface. The aggregated transmit traffic statistics may also be printed, transmitted via a network, stored, and/or reported in some other manner. The aggregated transmit traffic statistics may be presented, printed, transmitted, stored and/or report in some other manner in combination with received traffic statistics from the process 830 or FIG. 8.

The entire process 1030 may be cyclic in nature. The actions at 1032 through 1050 may be repeated cyclically or each time a new test data view is requested.

Figure 11:
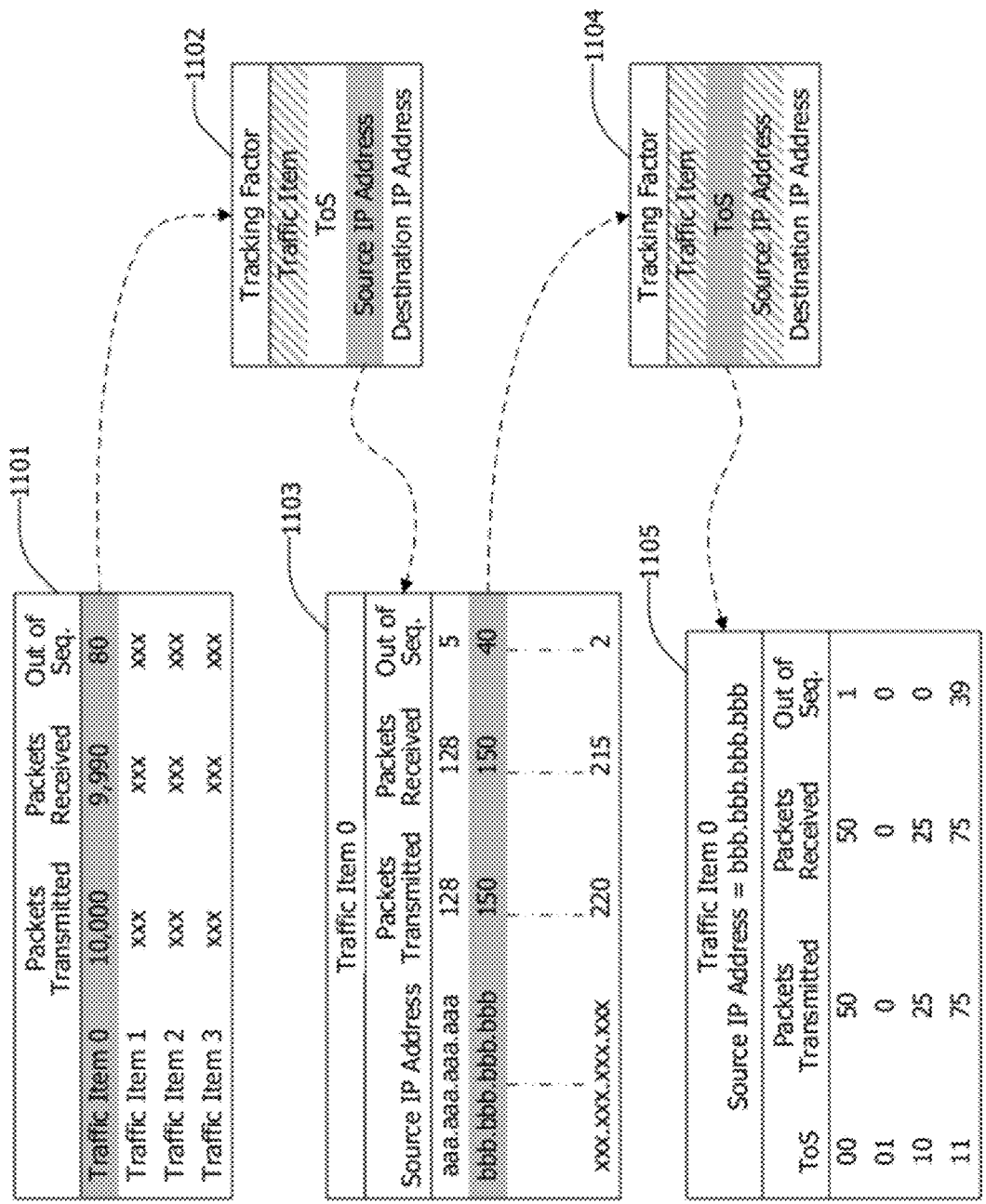
FIG. 11 is a graphical representation of a graphic user interface for selecting and displaying test data Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

FIG. 11 shows exemplary test data views 1101, 1103, 1105 which may be displayed to an operator or otherwise reported. The exemplary test data views 1101, 1103, 1105 combine aggregated received traffic statistics from the process 830 of FIG. 8 and aggregated transmit traffic statistics from the process 1030 of FIG. 10. The exemplary test data views are based on the example first started in FIG. 6. For ease of presentation, only one transmit statistic, number of packets transmitted, and two received traffic statistics, number of packets received and number of packets out-of-sequence, are shown. In a real-world test numerous other received traffic statistics may be accumulated and presented. Received traffic statistics may include quantitative data such as number of packet received, number of packets received out of sequence, and number of packets lost; temporal data such as minimum, maximum, and/or average latency; and other information. The received traffic statistics may include data accumulated at destination port units and data, such as number of packets transmitted, accumulated at source port units.

The first test data view 1101 shows both transmit traffic statistics and received traffic statistics aggregated according to traffic item. The first test data view may be consistent with the 1$^{st}$ aggregate mask 940-1 of FIG. 9. In keeping with the example of FIG. 6, traffic item has only four values. The four traffic items and the corresponding aggregated traffic statistics may be displayed, for example, in tabular form as shown at 1101 in FIG. 11.

The first test data view may be considered a first-level summary of data for a test session. A first-level summary view may present summary test data for all packet groups aggregated in accordance with a selected first tracking factor (in this example—traffic item). Another tracking factor such as, for example, source port number or destination port number may be selected as the first tracking factor and a similar first-level summary test data view may be generated.

An operator, upon reviewing a first-level test data view, may select one specific value for the first tracking factor and then request a second-level test data view aggregated according to a second tracking. In the example of FIG. 11, an operator may review the first-level test data view 1101 and select Traffic Item 0 (shown with shading). A list 1102 of possible second tracking factors may then be presented, and the operator may select a second tracking factor. In the example of FIG. 11, the operator is assumed to select Source IP Address (shown shaded in the table 1102) as the second tracking factor.

In response to the operator selection of Source IP Address, a second-level test data view 1103 may be generated. The exemplary second-level test data view 1103 may show only test data for Traffic Item 0, and may show the test data for Traffic Item 0 sorted and aggregated by source IP address. The second-level test data view 1103 may be generated using a filter mask 920 that rejects all test data not associated with Traffic Item 0 and an aggregate mask, such as the aggregate mask 940-2 that instructs port unit to aggregate traffic statistics based on the source IP address field of the filtered global flow IDs 925.

An operator, upon reviewing a second-level test data view, may select one specific value for the second tracking factor and then request a third-level test data view aggregated according to a third tracking factor. In the example of FIG. 11, an operator may review the second-level test data view 1102 and select source IP address bbb.bbb.bbb.bbb (shown with shading). A list 1104 of possible third tracking factors may then be presented, and the operator may select a third tracking factor. In the example of FIG. 11, the operator is assumed to select type of service (ToS, shown shaded in the table 1004) as the third tracking factor.

In response to the operator selection of ToS, a third-level test data view 1105 may be generated. The exemplary third-level test data view 1005 may show only test data for Traffic Item 0 and source IP address bbb.bbb.bbb.bbb sorted and aggregated by ToS. The third-level test data view 1105 may be generated using a filter mask 920 that rejects all test data not associated with Traffic Item 0 and source IP address bbb.bbb.bbb.bbb and an aggregate mask, such as the aggregate mask 940-3, that instructs port unit to aggregate traffic statistics based on the ToS of the filtered global flow IDs 925. One or more additional levels of sorting and aggregation may be available, depending on the number of tracking factors used of a given traffic item.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of testing a network, comprising:
    identifying a plurality of tracking factors, each tracking factor having a plurality of possible values;
    generating a plurality of global flow identifiers, the plurality of global flow identifiers including a unique global flow identifier corresponding to every possible combination of values for the plurality of tracking factors;
    one or more source port units transmitting a plurality of packets over the network, each packet including a packet group identifier (PGID) corresponding to one of the plurality of global flow identifiers;
    one or more destination port units receiving the packets via the network, the destination port units
        extracting the packet group identifier from each received packet, and
        accumulating traffic statistics for each of the plurality of PGIDs; and
    aggregating the accumulated traffic statistics for at least some of the plurality of PGIDs to generate aggregated traffic statistics based on a first tracking factor selected from the plurality of tracking factors.

2. The method of claim 1, wherein generating a plurality of global flow identifiers further comprises:
    for each tracking factor, generating a map to associate the respective plurality of values with a corresponding code, wherein the length of the code corresponding to each tracking factor is the minimum length sufficient to uniquely identify each of the respective plurality of values; and
    concatenating the codes corresponding to each possible combination of values for the plurality of tracking factors to form the plurality of global flow identifiers.

3. The method of claim 2, further comprising:
    identifying a port-specific subset of the plurality of global flow identifiers to be received at each destination port unit; and
    generating a port-specific PGID map for each destination port unit to associate each of the respective subset of global flow identifiers with one or more PGID.

4. The method of claim 3, wherein aggregating the accumulated traffic statistics further comprises:
    each destination port unit:
        selecting a plurality of filtered PGIDs in accordance with a filter mask,
        converting the plurality filtered PGIDs to corresponding plurality of filtered global flow identifier based on the port-specific PGID map, and
        aggregating traffic statistics associated with the filtered PGIDs based on the filtered global flow identifiers and the first tracking factor.

5. The method of claim 4, wherein aggregating the accumulated traffic statistics further comprises:
    each destination port unit transmitting aggregated traffic statistics to a test administrator computing device; and
    the test administrator computing device aggregating traffic statistics received from the destination port units.

6. The method of claim 1, wherein
    each of the plurality of packets is comprised of a plurality of data fields, and
    the plurality of tracking factors include a traffic item identifier and one or more of a source port identifier, a destination port identifier, and a field from the plurality of data fields.

7. The method of claim 6, wherein the tracking factors include at least one of a source IP address, a destination IP address, a type of service, and a protocol.

8. The method of claim 6, where the tracking factors are different for each traffic item.

9. The method of claim 1, wherein aggregating the accumulated traffic statistics further comprises:
    determining, for each PGID, a corresponding value for the first tracking factor; and
    aggregating traffic statistics for PGIDS having a common value for the first tracking factor.

10. The method of claim 1, further comprising:
    selecting a second tracking factor from the plurality of tracking factors;
    selecting a specific value for the second tracking factor;
    filtering the accumulated traffic statistics to select only PGIDs associated with the selected specific value for the second tracking factor; and
    aggregating the filtered traffic statistics for each of the selected PGIDs to generate the summary statistics for the first tracking factor.

11. An apparatus for testing a network, comprising:
    at least one source port unit to transmit a plurality of packets over the network, each packet including a packet group identifier (PGID);
    at least one destination port unit comprising:
        a network interface unit to receive packets from the network,
        a statistics engine configured to extract a PGID from each received packet and to accumulate traffic statistics associated with each PGID,
        a statistics memory to store the accumulated traffic statistics for a plurality of PGIDs, and
        a port processor coupled to the statistics memory, the port processor performing actions including:
            retrieving traffic statistics associated with a selected plurality of PGIDs from the statistics memory in accordance with a filter mask,
            converting the selected PGIDs into a corresponding plurality of global flow identifiers based on a port-specific PGID map, and
            aggregating the retrieved traffic statistics in accordance with an aggregate mask and the plurality of global flow identifiers.

12. The apparatus of claim 11, further comprising:

a test administrator computing device coupled to the one or more destination port units;

wherein the actions performed by the port processor of each destination port unit include transmitting aggregated traffic statistics to the test administrator; and wherein the test administrator performs actions including aggregating the aggregated traffic statistics received from the one or more port units.

13. The apparatus of claim 12, wherein the actions performed by the test administrator further include:

receiving a request for specific test data; and generating at least one filter mask and at least one aggregate mask based on the request.

14. The apparatus of claim 13, wherein the apparatus comprises a plurality of port units, and the test administrator generates a unique filter mask for each port unit.

15. The apparatus of claim 13, wherein the test administrator receives a plurality of requests for different test data, and the test administrator generates a unique aggregate mask for each request.

* * * * *